(12) United States Patent
Tsuru et al.

(10) Patent No.: US 11,578,659 B2
(45) Date of Patent: Feb. 14, 2023

(54) COOLING STRUCTURE FOR TURBINE AIRFOIL

(71) Applicant: KAWASAKI JUKOGYO KABUSHIKI KAISHA, Kobe (JP)

(72) Inventors: Tomoko Tsuru, Akashi (JP); Katsuhiko Ishida, Kobe (JP)

(73) Assignee: KAWASAKI JUKOGYO KABUSHIKI KAISHA, Akashi (JP)

( * ) Notice: Subject to any disclaimer, the term of this patent is extended or adjusted under 35 U.S.C. 154(b) by 0 days.

(21) Appl. No.: 16/558,646

(22) Filed: Sep. 3, 2019

(65) Prior Publication Data
US 2020/0018235 A1 Jan. 16, 2020

Related U.S. Application Data

(63) Continuation of application No. PCT/JP2018/008643, filed on Mar. 6, 2018.

(30) Foreign Application Priority Data

Mar. 10, 2017 (JP) .............................. JP2017-045925

(51) Int. Cl.
*F02C 7/18* (2006.01)
*F01D 5/18* (2006.01)
*F01D 9/06* (2006.01)

(52) U.S. Cl.
CPC ................... *F02C 7/18* (2013.01); *F01D 5/18* (2013.01); *F01D 5/187* (2013.01); *F01D 5/188* (2013.01);

(Continued)

(58) Field of Classification Search
CPC .......... F01D 9/065; F01D 5/186; F01D 5/187; F01D 5/188; F05D 2260/20;

(Continued)

(56) References Cited

U.S. PATENT DOCUMENTS 4,407,632 A * 10/1983 Liang ..................... F01D 5/187
415/115
5,603,606 A 2/1997 Glezer et al.
(Continued)

FOREIGN PATENT DOCUMENTS

JP    10-089006 A    4/1998
JP    2009-221995 A    10/2009
(Continued)

*Primary Examiner* — Christopher Verdier
(74) *Attorney, Agent, or Firm* — Sughrue Mion, PLLC

(57) ABSTRACT

A cooling structure for a turbine airfoil includes: a lattice structure body formed such that a first rib set and a second rib set arranged in a cooling passage are stacked on each other in a lattice pattern; and lattice communication portions that allow passages formed between ribs of the first rib set to communicate with passages formed between ribs of the second rib set. Each of the first and second rib sets has rib walls each including a pair of ribs that are inclined in directions opposite to each other relative to an imaginary boundary line extending in a movement direction of a cooling medium and that are in contact with each other on the imaginary boundary line. A plurality of lattice communication portions are formed between two lattice communication portions at opposite end portions of each rib that forms the rib wall.

7 Claims, 6 Drawing Sheets

(52) U.S. Cl.
CPC ...... *F01D 9/065* (2013.01); *F05D 2260/2212* (2013.01); *F05D 2260/22141* (2013.01)

(58) Field of Classification Search
CPC ......... F05D 2260/201; F05D 2260/202; F05D 2260/22141; F05D 2260/2212; F02C 7/18
See application file for complete search history.

(56) References Cited

U.S. PATENT DOCUMENTS

| | | | |
|---|---|---|---|
| 5,919,031 A | 7/1999 | Hall et al. | |
| 6,382,907 B1 * | 5/2002 | Bregman | F01D 5/187 |
| | | | 415/115 |
| 6,634,858 B2 * | 10/2003 | Roeloffs | F01D 5/186 |
| | | | 29/889.721 |
| 7,674,092 B2 * | 3/2010 | Annerfeldt | F01D 5/187 |
| | | | 416/97 R |
| 10,598,027 B2 * | 3/2020 | Bregman | F28F 13/08 |
| 2010/0226791 A1 * | 9/2010 | Fujimura | F01D 5/187 |
| | | | 416/97 R |
| 2013/0034429 A1 * | 2/2013 | Carter | F01D 5/187 |
| | | | 415/178 |
| 2014/0328669 A1 * | 11/2014 | Bregman | F01D 5/187 |
| | | | 415/115 |
| 2016/0003549 A1 * | 1/2016 | Fujimoto | F02C 7/18 |
| | | | 165/164 |
| 2016/0169003 A1 * | 6/2016 | Wong | F01D 9/041 |
| | | | 415/1 |

FOREIGN PATENT DOCUMENTS

| | | |
|---|---|---|
| JP | 4957131 B2 | 6/2012 |
| JP | 2014177900 A | 9/2014 |

\* cited by examiner

COOLING STRUCTURE FOR TURBINE AIRFOIL

CROSS REFERENCE TO THE RELATED APPLICATION

This application is a continuation application, under 35 U.S.C. § 111(a), of international application No. PCT/JP2018/008643, filed Mar. 6, 2018, which claims priority to Japanese patent application No. 2017-045925, filed Mar. 10, 2017, the disclosure of which are incorporated by reference in their entirety into this application.

BACKGROUND OF THE INVENTION

Field of the Invention

The present invention relates to a structure for internally cooling a turbine airfoil of a gas turbine engine, that is, a stator vane and a rotor blade in a turbine.

Description of Related Art

A turbine that forms a part of a gas turbine engine is disposed downstream of a combustor and high-temperature gas burnt in the combustor is supplied to the turbine. Thus, the turbine is exposed to high temperatures during operation of the gas turbine engine. Therefore, it is necessary to cool a turbine airfoil, that is, a stator vane and a rotor blade. As a structure for cooling such a turbine airfoil, it has been known to introduce part of an air compressed by a compressor into a cooling passage formed in the airfoil and cool the turbine airfoil using the compressed air as a cooling medium (see, for example, Patent Document 1).

In the case of using part of the compressed air to cool the turbine airfoil, it is not necessary to introduce a cooling medium from the outside, so that there is a merit that the cooling structure can be simplified. However, when a large amount of air compressed by the compressor is used for cooling, it leads to a reduction in engine efficiency. Thus, it is necessary to efficiently perform cooling with as little air as possible. As a structure for cooling a turbine airfoil with high efficiency, use of a so-called lattice structure body formed by combining a plurality of ribs in a lattice pattern has been proposed (see, for example, Patent Document 2). Generally, in the lattice structure body, opposite side ends thereof are closed by end portion wall surfaces. Meanwhile, the cooling medium flowing through one passage comes into contact with a partition plate, which is a wall surface partitioning the inside and the outside of the structure, is deflected and flows into the other passage. Similarly, the cooling medium flowing through the other passage comes into contact with the partition plate of the structure, is deflected and flows into the one passage. By the cooling medium repeating the contact with the end portion wall surface and the deflection as described above, cooling is enhanced. In addition, cooling is enhanced by vortex flow generated when the cooling medium traverses the ribs of the lattice pattern.

RELATED DOCUMENT

Patent Document

[Patent Document 1] U.S. Pat. No. 5,603,606
[Patent Document 2] JP Patent No. 4957131

SUMMARY OF THE INVENTION

However, if a large number of partition plates are provided to the lattice structure body in order to enhance cooling efficiency, the weight of the turbine airfoil increases. In addition, in the case where a large number of partition plates are provided to the lattice structure body and the number of passages between the partition plates is decreased, when a part of the passages is clogged for some reason, the flow rate balance in all the passages between the partition plates is largely biased. As a result, a cooling distribution in the airfoil is biased, thereby reducing the durability of the turbine airfoil.

Therefore, in order to solve the above-described problem, an object of the present invention is to provide a cooling structure that is able to cool a turbine airfoil with high efficiency while inhibiting weight increase and durability reduction of the turbine airfoil.

In order to achieve the above-described object, a cooling structure for a turbine airfoil according to the present invention is a structure for internally cooling a turbine airfoil of a turbine driven by high-temperature gas, the cooling structure including:

a lattice structure body including:
a first rib set composed of a plurality of ribs arranged on a first wall surface of a cooling passage that is formed within the turbine airfoil,
a second rib set composed of a plurality of ribs arranged on a second wall surface opposed to the first wall surface of the cooling passage, the first rib set and the second rib set being stacked on each other so as to form a lattice pattern, and
a plurality of lattice communication portions that allow passages formed between the plurality of ribs of the first rib set to communicate with passages formed between the plurality of ribs of the second rib set, in which each of the first rib set and the second rib set includes rib walls each including a pair of ribs that extend so as to be inclined in directions opposite to each other relative to an imaginary boundary line extending in a movement direction of an entirety of a cooling medium flowing through the cooling passage and that are in contact with each other on the imaginary boundary line, and in each of the first rib set and the second rib set, each rib that forms at least one of the rib walls extends such that a plurality of lattice communication portions are formed between the two lattice communication portions at opposite end portions of the rib.

According to this configuration, on the imaginary boundary line of the lattice structure body, the cooling media that have flowed thereinto from the passages inclined in the opposite directions collide against each other, whereby the static pressure rises and each cooling medium is deflected. That is, by inclining the ribs in the opposite directions relative to the imaginary boundary line, the same cooling effect as that in the case where a partition plate is provided on the imaginary boundary line can be obtained without providing a partition plate on the imaginary boundary line. Therefore, high cooling efficiency can be achieved while weight increase and durability reduction of the turbine airfoil are inhibited.

Moreover, in the lattice structure body, vortex flow is generated in the cooling medium by the cooling medium mainly passing through the communication portions and traversing the ribs of the other rib set. In the present invention, each rib that forms the rib wall is extended such that a plurality of lattice communication portions are formed between two lattice communication portions at opposite end portions of the rib. Thus, a distance sufficient to form vortex flow and cool the wall surfaces of the lattice passage while the cooling medium is flowing along the passage between the ribs is ensured.

In one embodiment of the present invention, the first rib set and the second rib set may have a common imaginary boundary line in a plan view and may be arranged such that apex portions of the rib walls thereof are overlaid on each other. According to this configuration, on the imaginary boundary line, the cooling medium is smoothly deflected from one lattice passage to another lattice passage.

In one embodiment of the present invention, each of the first rib set and the second rib set may be formed so as to be symmetrical with respect to the imaginary boundary line. According to this configuration, a rise in static pressure due to cooling medium collision on the imaginary boundary line can be caused more effectively, and it is easy to form the lattice structure body.

In one embodiment of the present invention, the movement direction of the entirety of the cooling medium may be a direction from a base portion toward a tip portion in a height direction of the turbine airfoil. According to this configuration, since the base portion of the turbine airfoil, which is a portion to which great stress is applied and thus is a portion for which the necessity for cooling is higher, is located at the upstream side of the cooling medium, higher cooling efficiency is achieved.

In one embodiment of the present invention, a cooling medium leading portion obtained by the first wall surface and the second wall surface being formed as a flat surface may be provided to the cooling passage in the tip portion of the turbine airfoil, and a discharge hole through which the cooling medium is discharged from the cooling medium leading portion to the outside may be provided in an airfoil wall at the tip portion of the turbine airfoil. According to this configuration, since the cooling medium leading portion is provided to the airfoil tip portion for which the necessity for cooling is relatively low, the cooling medium can be smoothly discharged while cooling efficiency is maintained.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
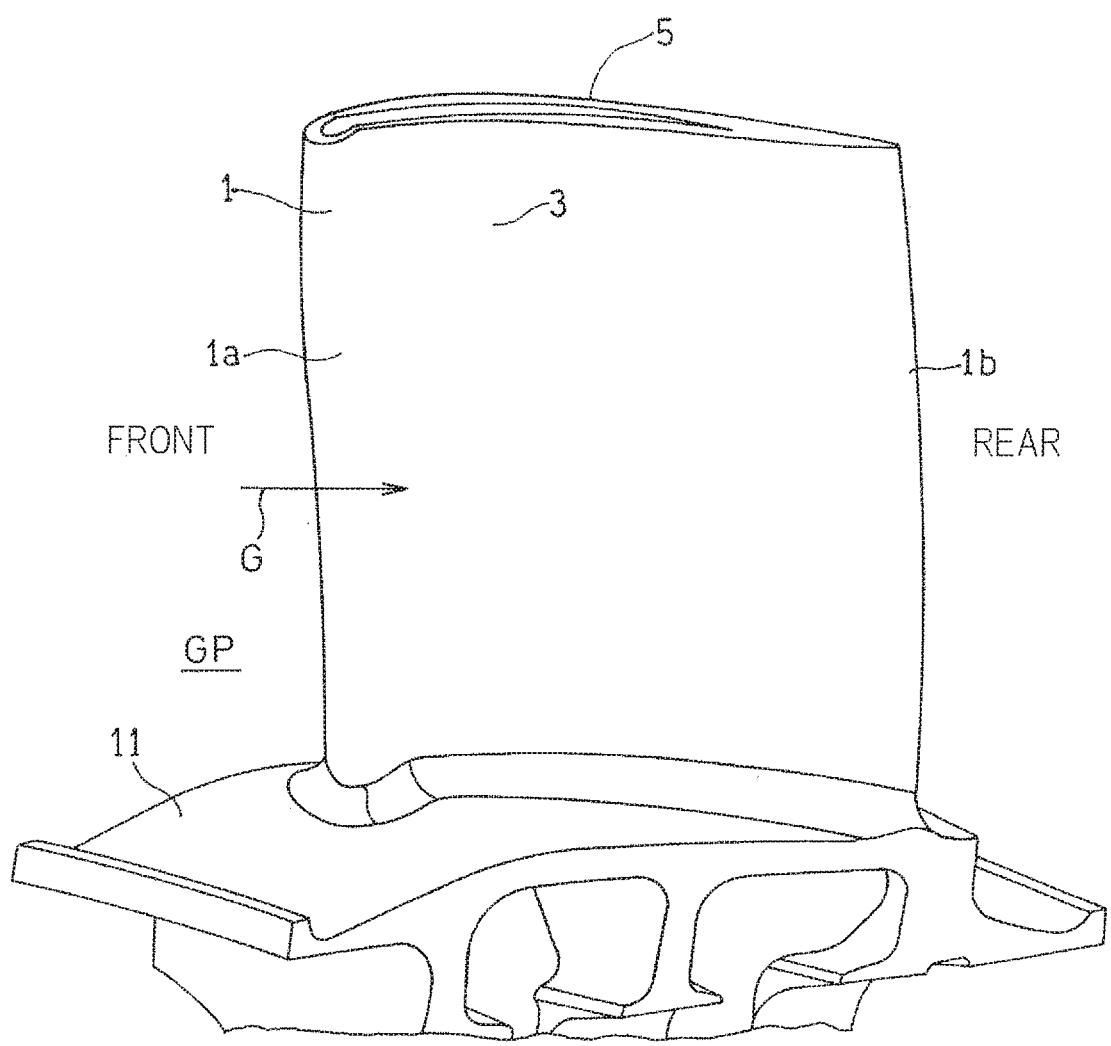
FIG. 1 is a perspective view showing an example of a turbine airfoil to which a cooling structure according to an embodiment of the present invention is applied.

Hereinafter, embodiments of the present invention will be described with reference to the drawings. FIG. 1 is a perspective view showing a rotor blade 1 of a turbine of a gas turbine engine to which a cooling structure for a turbine airfoil according to an embodiment of the present invention is applied. The turbine rotor blade 1 forms a part of a turbine that is driven by high-temperature gas G, flowing in an arrow direction, which is supplied from a combustor that is not shown. The turbine rotor blade 1 has: a first airfoil wall 3 that is curved so as to be concave relative to a passage GP for the high-temperature gas G; and a second airfoil wall 5 that is curved so as to be convex relative to the passage GP for the high-temperature gas. In the present specification, the upstream side along the flow direction of the high-temperature gas G (the left side in FIG. 1) is referred to as a front side, and the downstream side (the right side in FIG. 1) is referred to as a rear side. In the following description, the turbine rotor blade 1 is mainly described as an example of a turbine airfoil to which the cooling structure is provided, but the cooling structure according to the present embodiment can be similarly applied to a turbine stator vane that is a turbine airfoil, unless particularly described otherwise.

Figure 2:
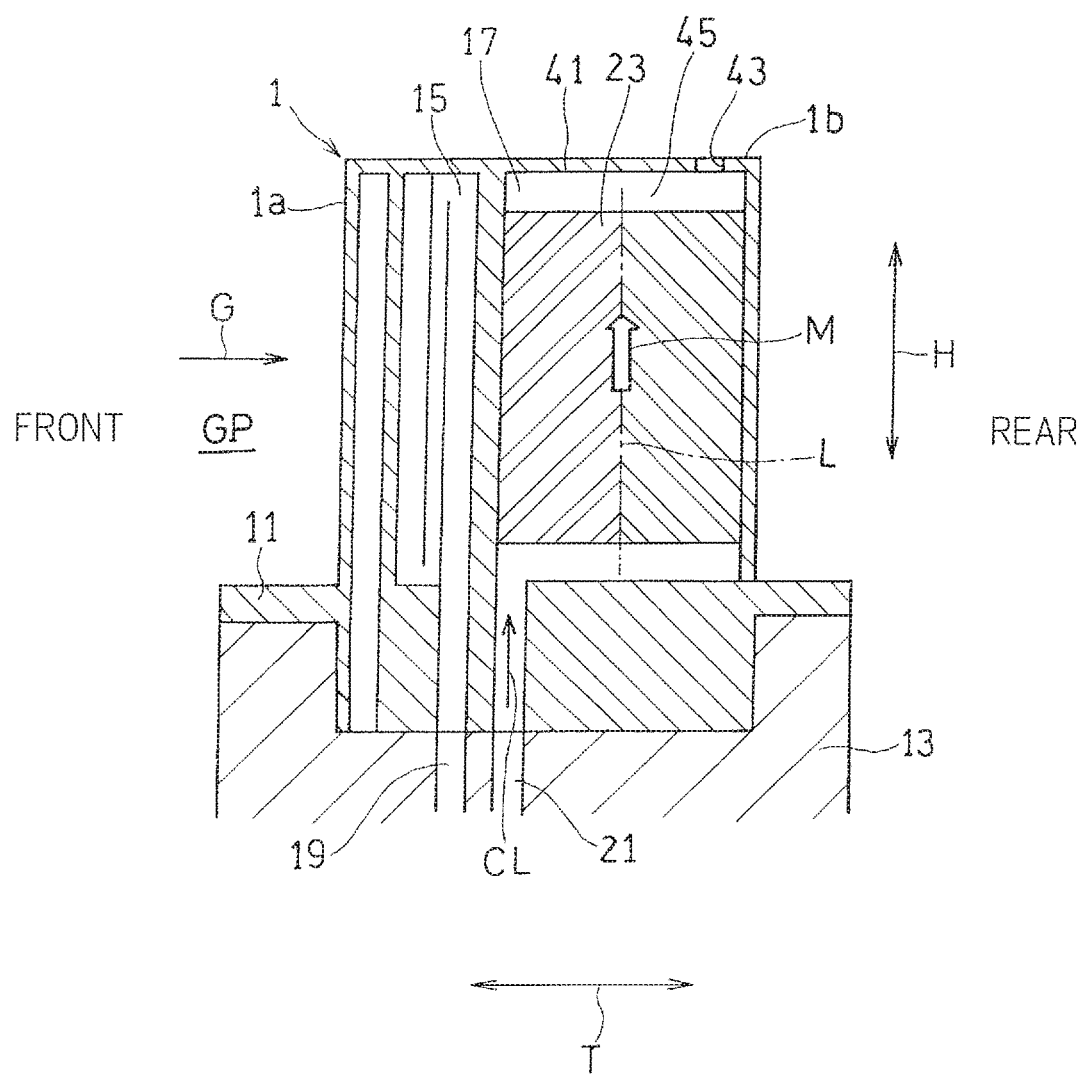
FIG. 2 is a longitudinal cross-sectional view schematically showing the cooling structure for the turbine airfoil in FIG. 1.
Figure 3:
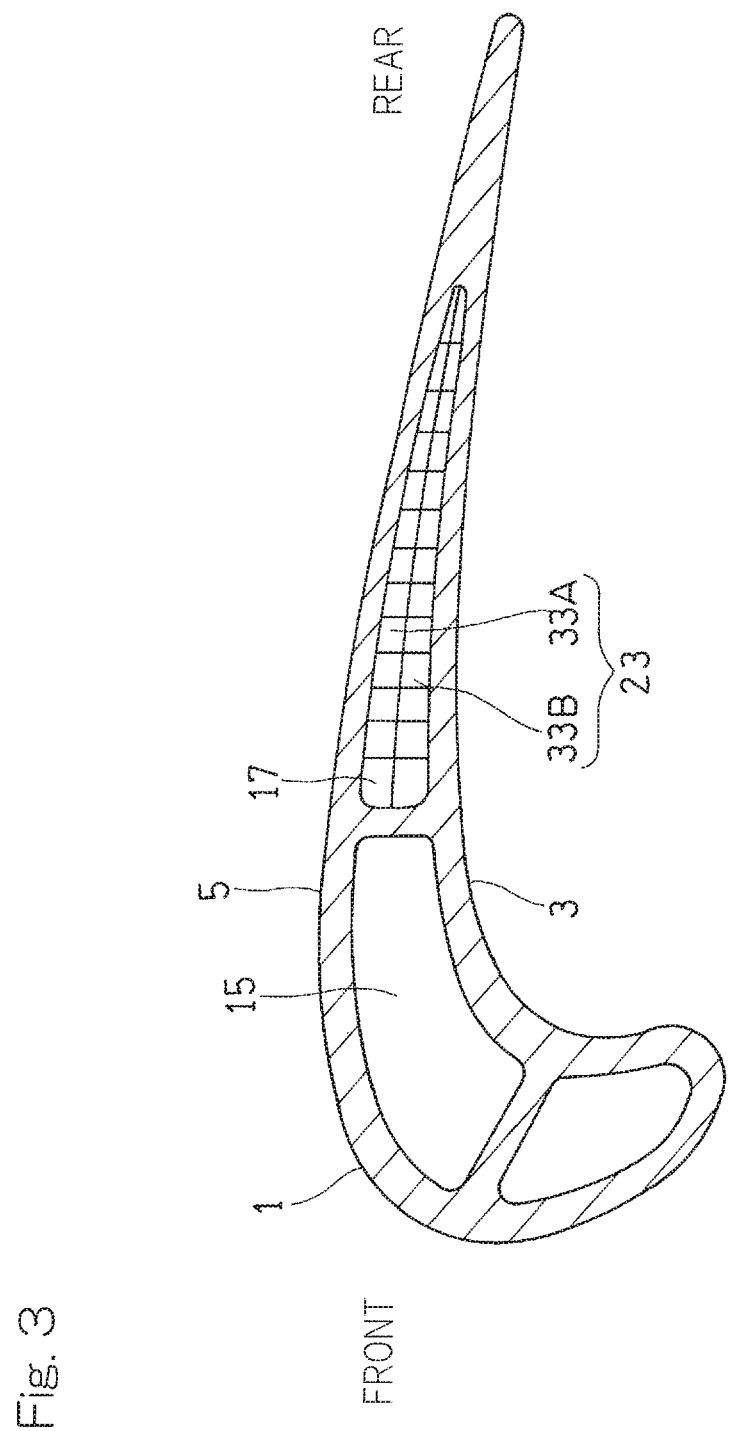
FIG. 3 is a transverse cross-sectional view of the turbine airfoil in FIG. 1.

Specifically, a large number of turbine rotor blades 1 are provided in a circumferential direction in an embedded manner such that, as shown in FIG. 2, a platform 11 of each turbine rotor blade 1 is connected to an outer circumferential portion of a turbine disc 13, whereby the turbine is formed. A front cooling passage 15 is formed within a front portion 1a of the turbine rotor blade 1 so as to extend in a blade height direction H and turn back. A rear cooling passage 17 is formed within a rear portion 1b of the turbine rotor blade 1. These cooling passages 15 and 17 are formed by using a space between the first airfoil wall 3 and the second airfoil wall 5 as shown in FIG. 3.

As shown in FIG. 2, a cooling medium CL flows through a front cooling medium introduction passage 19 and a rear cooling medium introduction passage 21, which are formed within the turbine disc 13 at the radially inner side, toward the radially outer side, and is introduced into the front cooling passage 15 and the rear cooling passage 17, respectively. In the present embodiment, a part of a compressed air from a compressor that is not shown is used as the cooling medium CL. The cooling medium CL supplied to the front cooling passage 15 is discharged to the outside through a discharge hole that communicates with the outside of the turbine rotor blade 1 and that is not shown. The cooling medium CL supplied to the rear cooling passage 17 is discharged to the outside through a discharge hole 43 that is provided in an airfoil wall at a tip portion of the turbine rotor blade 1. The discharge hole 43 will be described in detail later.

Hereinafter, an example in which the cooling structure according to the present embodiment is provided to the rear portion 1b of the turbine rotor blade 1 will be described.

However, the cooling structure according to the present embodiment may be provided to any portion of the turbine rotor blade 1. In the present embodiment, in the rear cooling passage 17, the entirety of the cooling medium CL flows along the height direction H of the turbine rotor blade 1 in a direction from a base portion side toward the tip portion side. In the present specification, the movement direction of the entirety of the cooling medium CL is referred to as a cooling medium movement direction M. In addition, a direction orthogonal to the cooling medium movement direction M in the rear cooling passage 17 is referred to as a transverse direction T.

Figure 4:
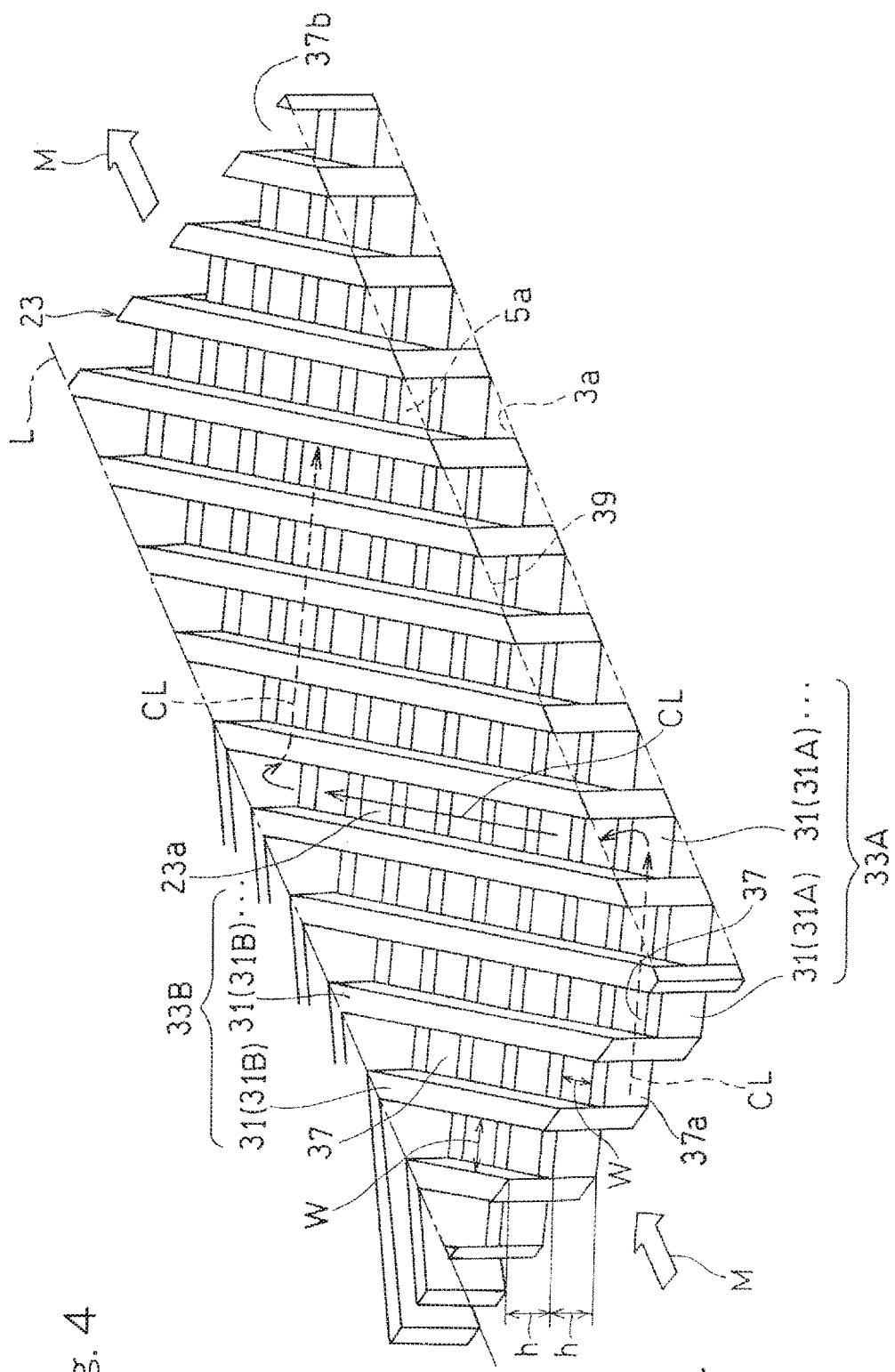
FIG. 4 is a perspective view showing a lattice structure body used in the cooling structure in FIG. 2.

A lattice structure body 23 is provided within the rear cooling passage 17, as one element that forms a part of the cooling structure for internally cooling the turbine rotor blade 1. As shown in FIG. 4, the lattice structure body 23 is formed by stacking two rib sets each composed of a plurality of ribs 31 on each other so as to form a lattice pattern on opposing wall surfaces of the rear cooling passage 17. In the present embodiment, a first rib set (lower rib set in FIG. 4) 33A including a plurality of first ribs 31A that are arranged at equal intervals so as to be parallel to each other and a second rib set (upper rib set in FIG. 4) 33B including a plurality of second ribs 31B that are arranged at equal intervals so as to be parallel to each other are stacked so as to form a lattice pattern. In other words, the first rib set 33A and the second rib set 33B are in contact with each other at intersection portions of the lattice pattern in a plan view. The first ribs 31A and the second ribs 31B are provided on two wall surfaces opposing each other in the blade thickness direction of the turbine rotor blade 1, that is, a first wall surface 3a that is a wall surface of the first airfoil wall 3 and a second wall surface 5a that is a wall surface of the second airfoil wall 5, respectively.

As shown in FIG. 4, in the lattice structure body 23, the gap between the adjacent ribs 31, 31 of each rib set 33A, 33B form a passage (lattice passage) 37 for the cooling medium CL. A portion at which the lattice passage 37 of the first rib set 33A and the lattice passage 37 of the second rib set 33B intersect each other in a plan view forms a lattice communication portion 23a that allows the lattice passages 37, 37 of both rib sets 33A and 33B to communicate with each other through the lattice communication portion 23a.

In the lattice structure body 23, the most upstream ends of the respective lattice passages 37 are not closed but are open at the upstream side, and these openings thereof form inlets (hereinafter, simply referred to as "lattice inlets") 37a of the lattice passages 37. In the lattice structure body 23, the most downstream ends of the respective lattice passages 37 are not closed but are open at the downstream side, and these openings thereof form outlets (hereinafter, simply referred to as "lattice outlets") 37b of the lattice passages 37.

Figure 5:
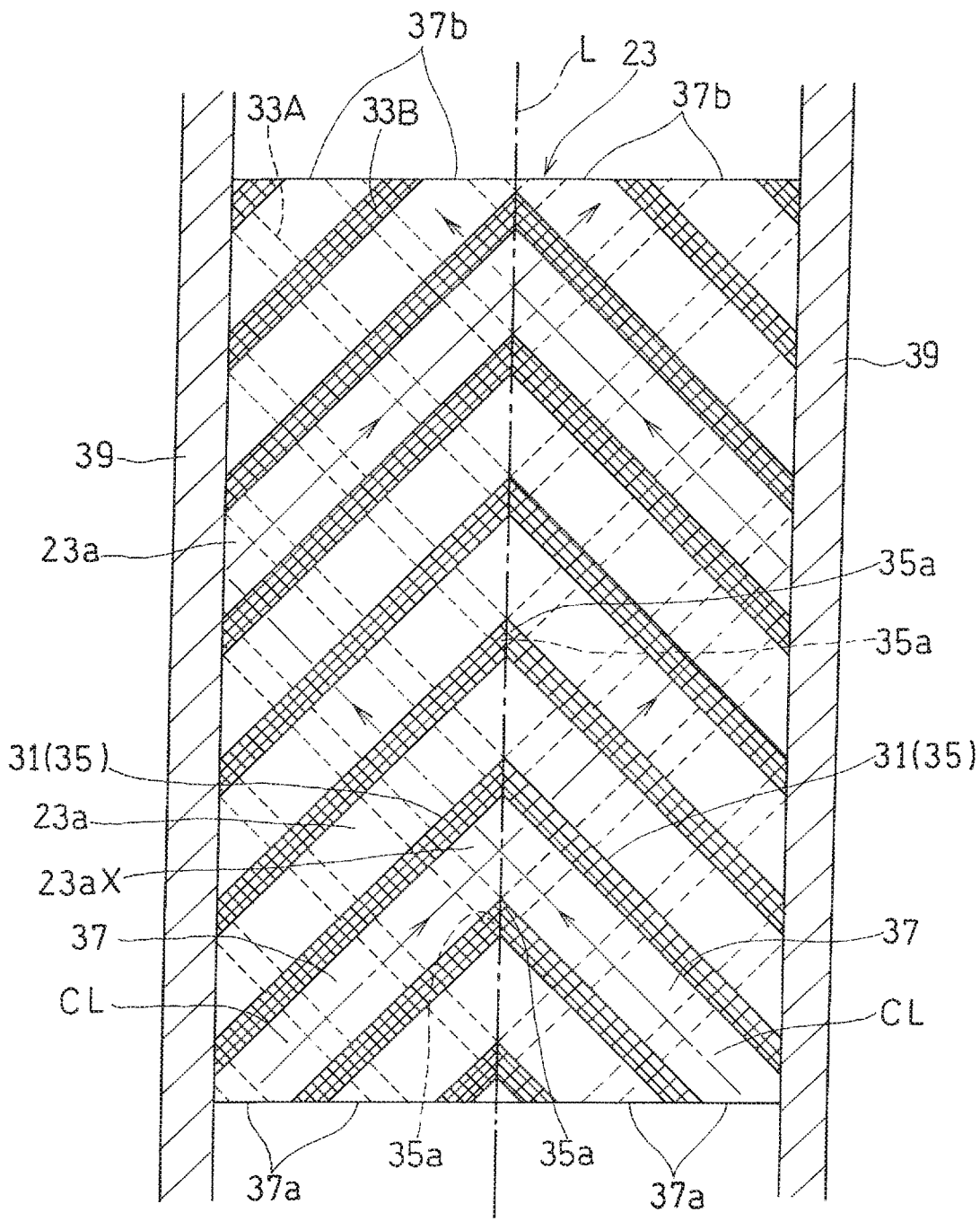
FIG. 5 is a plan view schematically showing the lattice structure body used in the cooling structure in FIG. 2.

As shown in FIG. 5, each of the first rib set 33A and the second rib set 33B includes rib walls 35 each including a pair of ribs 31, 31 that extend so as to be inclined in directions opposite to each other relative to an imaginary boundary line L extending in the cooling medium movement direction M, and that are in contact with each other on the imaginary boundary line L. In other words, the imaginary boundary line L in the present specification is an imaginary straight line that defines the boundary between one cooling region including the rib portions, inclined in one direction, of each rib set 33A, 33B and another cooling region that is adjacent to the one cooling region and that includes the rib portions, inclined in the opposite direction, of each rib set 33A, 33B in the lattice structure body 23. In the shown example, each of the first rib set 33A and the second rib set 33B is formed so as to be symmetrical with respect to the imaginary boundary line L. In other words, each of the rib walls 35 in each rib set has a V shape that has an apex portion 35a on the imaginary boundary line L and that is symmetrical with respect to the imaginary boundary line L.

In the shown example, the first rib set 33A and the second rib set 33B are arranged such the first rib set 33A and the second rib set 33B have the common imaginary boundary line L in a plan view (that is, the imaginary boundary lines L thereof coincide with each other in a plan view) and the apex portions 35a of the rib walls 35 thereof are overlaid on each other. In other words, as shown in FIG. 5, the entirety of the first rib set 33A and the entirety of the second rib set 33B form a lattice shape that is continuous over the entirety of the lattice structure body 23 in a plan view. Therefore, a lattice communication portion 23a (a lattice communication portion located on the imaginary boundary line L and shown by reference numeral "23aX" in FIG. 5) having the same shape in a plan view and the same area as those of another lattice communication portion 23a that is not located on the imaginary boundary line L is also formed between the closest apex portions 35a, 35a of each rib set 33A, 33B that are not overlaid on each other.

The cooling medium CL introduced into the lattice structure body 23 initially flows into the lattice passages 37 through the lattice inlets 37a of one rib set (the lower first rib set 33A in the shown example) and traverses the other rib set (the upper second rib set 33B in the shown example) as shown by broken line arrows in FIG. 5, thereby generating vortex flow. That is, in the lattice structure body 23, the cooling medium CL generates vortex flow by passing through the lattice communication portions 23a.

Thereafter, the cooling medium CL collides against partition bodies 39, so as to be deflected, and flows from the collision portions into the lattice passages 37 of the other rib set (the upper second rib set 33B in the shown example) as shown by solid line arrows in FIG. 5. The partition bodies 39 are structures provided at the lateral sides of the lattice structure body 23. As each partition body 39, any member may be used as long as the member can substantially block flow of the cooling medium CL flowing through the lattice passages 37 and the cooling medium CL can be collided at the side portion of the lattice structure body 23 and deflected so as to flow from one lattice passage 37 into another lattice passage 37. In the present embodiment, a partition plate that is a flat plate-like side wall is used as each partition body 39, but, for example, a plurality of partition pin fins may be used as each partition body 39.

In the present embodiment, furthermore, as shown in FIG. 5, at the lattice communication portion 23aX of the lattice passages 37 located on the imaginary boundary line L, the cooling media CL that have flowed thereinto from the passages inclined in the opposite directions collide against each other. Due to the collision of the cooling media CL against each other, the static pressure in each lattice passage 37 rises, and each of the cooling medium CL is deflected and flows into another lattice passage 37. That is, also in a portion on the imaginary boundary line L where no structure against which the cooling medium collides, such as a partition body, is present, deflection of the cooling medium CL to another lattice passage 37 occurs. Vortex flow is also generated in the cooling medium CL by the cooling medium CL deflected at the partition bodies 39 and on the imaginary boundary line L.

After repeating a process of flowing through the lattice passages 37 and flowing into other lattice passages 37 at the partition bodies 39 and on the imaginary boundary line L in the lattice structure body 23 as described above, the cooling medium CL is discharged from the lattice structure body 23. In this process, vortex flow is generated in flow of the cooling medium CL by the cooling medium CL passing through the lattice communication portions 23a and traversing the other rib set extending in a direction traversing the lattice passages 37, and by the cooling medium CL deflected, whereby cooling of the wall surfaces 3a and 5a is enhanced.

Moreover, in each of the first rib set 33A and the second rib set 33B, each rib 31, 31 that forms the rib wall 35 (the rib 31 extending from the partition body 39 to the imaginary boundary line L) extends such that a plurality of (three in the shown example) communication portions 23a are formed between the two lattice communication portions 23a at opposite end portions of the rib 31. With such configuration, a distance, which is sufficient to form vortex flow and cool the wall surfaces of the lattice passage 37 while the cooling medium CL is flowing between the partition body 39 and the portion on the imaginary boundary line L along the lattice passage 37 between the ribs, is ensured.

In the present embodiment, as shown in FIG. 4, at the respective outlet 37b portions of the lattice passages 37, the heights of the respective upper and lower ribs 31, that is, heights h of the lattice passages 37 in the blade thickness direction, are equal to each other. In addition, the interval between the ribs 31, 31 in the first rib set 33A and the interval between the ribs 31, 31 in the second rib set 33B are equal to each other. That is, a width w of the lattice passages 37 in the first rib set 33A and a width w of the lattice passages 37 in the second rib set 33B are equal to each other.

The first rib set 33A and the second rib set 33B do not necessarily have to be symmetrical with respect to the imaginary boundary line L. For example, the positions of the respective ribs 31, 31 that form each rib wall 35 of each rib set may be displaced to the extent that the ribs 31, 31 are in contact with each other on the imaginary boundary line L. Additionally or alternatively, the inclination angles of the respective ribs 31, 31 relative to the imaginary boundary line L may be different from each other.

In the present embodiment, the first rib set 33A and the second rib set 33B have the common imaginary boundary line L in a plan view and are arranged such that the apex portions 35a of the rib walls 35 thereof are overlaid on each other. Thus, on the imaginary boundary line L on which the cooling media CL collide against each other, the cooling medium CL is smoothly deflected from one lattice passage 37 to another lattice passage 37. As a matter of course, the apex portions 35a of the first rib set 33A and the apex portions 35a, 35a of the second rib set 33B do not have to be overlaid on each other. In addition, the imaginary boundary lines L of the first rib set 33A and the second rib set 33B do not have to coincide with each other in a plan view.

Next, a structure for discharging the cooling medium CL from the rear cooling passage 17 to the outside of the turbine rotor blade 1 will be described. As shown in FIG. 2, the discharge hole 43 that provides communication between the rear cooling passage 17 and the outside is provided in a distal end wall 41 of the turbine rotor blade 1. That is, the cooling medium CL within the rear cooling passage 17 is discharged through the discharge hole 43 to the outside. In the present embodiment, furthermore, a cooling medium leading portion 45 obtained by the first wall surface 3a and the second wall surface 5a being formed as flat surfaces is formed at a downstream portion that is the distal end side of the rear cooling passage 17. More specifically, a portion of the rear cooling passage 17 at the downstream side (distal end side) with respect to the lattice outlets 37b is formed as the cooling medium leading portion 45. The cooling medium CL that has flowed out from the lattice outlets 37b of the lattice structure body 23 passes through the cooling medium leading portion 45 and is then discharged through the discharge hole 43 to the outside. The first wall surface 3a and the second wall surface 5a "being formed as flat surfaces" means that both wall surfaces are formed as surfaces on which no projection and/or recess is provided.

It is not essential to provide the cooling medium leading portion 45 having the above structure to the rear cooling passage 17. For example, the lattice structure body 23 may be disposed to the end portion of the rear cooling passage 17. Alternatively, a structure different from the lattice structure body 23, such as pin fins, may be provided in a region corresponding to the cooling medium leading portion 45. As a matter of course, as in the shown example, by providing the cooling medium leading portion 45 to the blade tip portion, for which the necessity for cooling is relatively low, it is possible to smoothly discharge the cooling medium while effectively cooling the base portion of the turbine rotor blade 1, for which the necessity for cooling is relatively high since the base portion is a portion to which great stress is applied. For the same reason, in the case where a lattice structure body 23 is provided to a turbine stator vane, the lattice structure body 23 may be provided only at the base side of the turbine stator vane, which is positioned on a radially outer side of the turbine.

In FIG. 2, the example in which the discharge hole 43 is provided in the distal end wall 41 is shown. However, a discharge hole 43 may be provided in another airfoil wall at the tip portion of the turbine rotor blade 1, that is, a portion of the first airfoil wall 3 and/or the second airfoil wall 5 that is connected to the lattice outlets 37b. The number of discharge holes 43 may be one as in the shown example, or may be two or more.

As shown in FIG. 5, the lattice structure body 23 according to the present embodiment has only the single imaginary boundary line L between a pair of the partition bodies 39, 39. Due to such a configuration, an effect of reducing the number of partition bodies while the structure of the lattice structure body 23 is simplified can be obtained. As a matter of course, the lattice structure body 23 may be formed so as to have two or more imaginary boundary lines L between a pair of the partition bodies.

Figure 6:
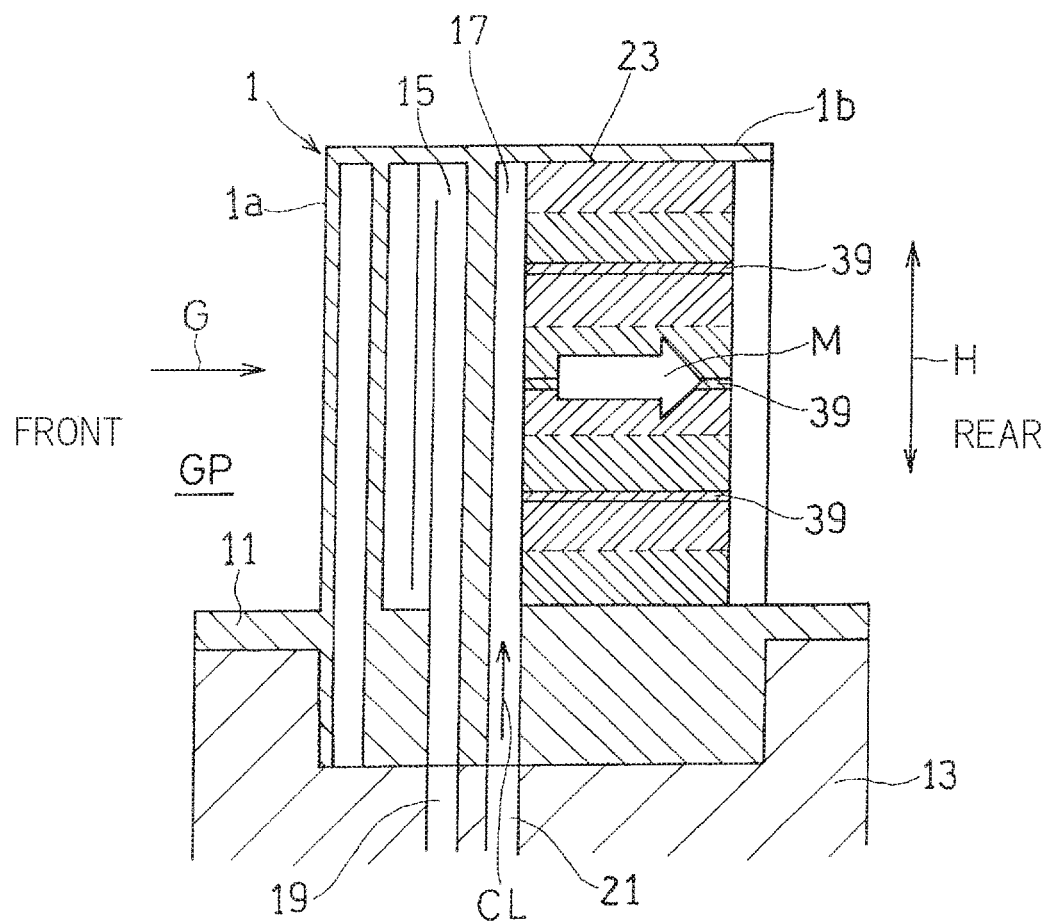
FIG. 6 is a longitudinal cross-sectional view schematically showing an example of arrangement of the cooling structure according to the embodiment of the present invention.

In the present embodiment, the cooling medium movement direction M in the rear cooling passage 17 is the direction from the base portion side toward the tip portion side in the height direction of the turbine rotor blade 1. However, as shown in FIG. 6, the cooling medium movement direction M may be a chord direction, that is, a direction along the flow direction of the high-temperature gas G outside the turbine rotor blade 1. In this case, as shown in FIG. 6, a plurality of lattice structure bodies 23 each having at least one imaginary boundary line L may be disposed so as to be aligned in the height direction H with partition bodies 39 interposed therebetween. In the shown example, four lattice structure bodies 23 are aligned in the height direction H with three partition bodies 39 interposed therebetween.

Also in the case where the cooling medium movement direction M is the height direction H, a plurality of lattice structure bodies 23 each having at least one imaginary boundary line L may be disposed so as to be aligned as necessary in the transverse direction T with partition bodies 39 interposed therebetween.

As described above, in the cooling structure according to the present embodiment, on the imaginary boundary line L of the lattice structure body 23, the cooling media CL that have flowed thereinto from the lattice passages inclined in the opposite directions collide against each other, whereby the static pressure rises and each cooling medium CL is deflected. That is, by inclining the ribs 31, 31 in the opposite directions relative to the imaginary boundary line L, the same cooling effect as that in the case where a partition body such as a partition plate is provided on the imaginary boundary line L can be obtained without providing such a partition body on the imaginary boundary line L. Therefore, high cooling efficiency can be achieved while weight increase and durability reduction of the turbine airfoil are inhibited.

Moreover, in the lattice structure body 23, vortex flow is generated in the cooling medium CL by the cooling medium CL mainly passing through the lattice communication portions 23a and traversing the ribs 31 of the other rib set. In the present invention, each rib 31, 31 that forms the rib wall 35 is extended such that a plurality of lattice communication portions 23a are formed between the two lattice communication portions 23a, 23a at opposite end portions of the rib 31. Thus, a distance sufficient to form vortex flow and cool the wall surfaces of the lattice passage 37 while the cooling medium CL is flowing along the lattice passage 37 between the ribs 31, 31, is ensured.

Although the present invention has been described above in connection with the embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Turbine rotor blade (Turbine airfoil)
3 . . . First airfoil wall
5 . . . Second airfoil wall
17 . . . Rear cooling passage (cooling passage)
23 . . . Lattice structure body
23a . . . Lattice communication portion
31 . . . Rib
33A . . . First rib set
33B . . . Second rib set
37 . . . Lattice passage
CL . . . Cooling medium
G . . . High-temperature gas
L . . . Imaginary boundary line

What is claimed is:

1. A cooling structure for internally cooling a turbine airfoil of a turbine driven by high-temperature gas, the cooling structure comprising:
a lattice structure body including:
a first rib set composed of a plurality of ribs arranged on a first wall surface of a cooling passage that is formed within the turbine airfoil,
a second rib set composed of a plurality of ribs arranged on a second wall surface opposed to the first wall surface of the cooling passage, the first rib set and the second rib set being stacked on each other so as to form a lattice pattern, and
a plurality of lattice communication portions that allow passages formed between the plurality of ribs of the first rib set to communicate with passages formed between the plurality of ribs of the second rib set,
wherein the first rib set includes a first rib wall including a pair of ribs that extend so as to be inclined in directions opposite to each other relative to an imaginary boundary line extending in a movement direction of an entirety of a cooling medium flowing through the cooling passage and that are in contact with each other on the imaginary boundary line,
the second rib set includes a second rib wall including a pair of ribs that extend so as to be inclined in directions opposite to each other relative to the imaginary boundary line, and
in each of the first rib set and the second rib set, each rib that forms at least one of the rib walls extends such that a plurality of lattice communication portions are formed between the two lattice communication portions at opposite end portions of the rib,
wherein the first rib set and the second rib set are in contact with each other at intersection portions of the lattice pattern in a plan view,
wherein the cooling structure further comprises a pair of partition bodies, consisting of a first partition body and a second partition body being respectively provided at opposite side ends of the lattice structure body such that the first partition body is provided at a first one of the opposite side ends and the second partition body is provided at a second one of the opposite side ends, each of the pair of partition bodies being configured to deflect the cooling medium such that the cooling medium flows from one passage to another of the passages formed between the plurality of ribs of the first rib and the passages formed between the plurality of ribs of the second rib set, and
wherein the lattice structure body has a single imaginary boundary line disposed between the pair of the partition bodies, the single imaginary boundary line being the imaginary boundary line.

2. The cooling structure as claimed in claim 1, wherein the imaginary boundary line of the first rib set and of the second rib set is common in the plan view and are arranged such that apex portions of the rib walls thereof are overlaid on each other.

3. The cooling structure as claimed in claim 1, wherein each of the first rib set and the second rib set is formed so as to be symmetrical with respect to the imaginary boundary line.

4. The cooling structure as claimed in claim 1, wherein the movement direction of the entirety of the cooling medium is a direction from a base portion toward a tip portion in a height direction of the turbine airfoil.

5. The cooling structure as claimed in claim 4, wherein a cooling medium leading portion formed as a flat surface is provided to the cooling passage in the tip portion of the turbine airfoil, and a discharge hole through which the cooling medium is discharged from the cooling medium leading portion to the outside of the turbine airfoil is provided in an airfoil wall at the tip portion of the turbine airfoil.

6. A cooling structure for internally cooling a turbine airfoil of a turbine driven by high-temperature gas, the cooling structure comprising:
a lattice structure body including:
a plurality of first rib sets, each of the plurality of first rib sets being composed of a plurality of ribs arranged on a first wall surface of a cooling passage that is formed within the turbine airfoil,
a plurality of second rib sets, each of the plurality of second rib sets being composed of a plurality of ribs arranged on a second wall surface opposed to the first wall surface of the cooling passage, wherein the plurality of first rib sets are respectively stacked on respective ones of the pluralities of the second rib sets so as to form a plurality of lattice patterns, and a plurality of lattice communication portions, included in the plurality of lattice patterns, that allow passages formed between the plurality of ribs of the plurality of first rib sets to communicate with passages formed between the plurality of ribs of the plurality of second rib sets, wherein each of the plurality of first rib sets includes a first rib wall including a pair of ribs that extend so as to be inclined in directions opposite to each other relative to an imaginary boundary line extending in a movement direction of a portion of a cooling medium flowing through the cooling passage and that are in contact with each other on the imaginary boundary line, each of the plurality of second rib sets includes a second rib wall including a pair of ribs that extend so as to be inclined in directions opposite to each other relative to the imaginary boundary line, and in each of the pluralities of the first rib sets and the second rib sets, each rib that forms at least one of the rib walls extends such that a plurality of the lattice communication portions are formed between the two lattice communication portions at opposite end portions of the rib, wherein respective ones of the first rib sets and the second rib sets are in contact with each other at intersection portions of the plurality of lattice patterns in a plan view, wherein the respective ones of the first rib sets and the second rib sets that are in contact with each other are separated by a partition body.

7. The cooling structure as claimed in claim 6, wherein the respective ones of the first rib sets and the second rib sets that are in contact with each other and are separated by the partition body are identically arranged with respect to the partition body.

* * * * *